United States Patent
Moss et al.

(10) Patent No.: US 10,863,724 B2
(45) Date of Patent: Dec. 15, 2020

(54) SYSTEM AND METHOD FOR TRACKING AND SCORING ANIMAL HEALTH AND MEAT QUALITY

(71) Applicant: Animal Health Analytics, Inc, St Louis, MO (US)

(72) Inventors: Harrison Moss, St Louis, MO (US); Thiag Loganathan, Potomac, MD (US); Mohan Jayaraman, Canton, MS (US); Terry Brandebourg, Auburn, AL (US); Matt Ackerman, New Palestine, IN (US)

(73) Assignee: Animal Health Analytics, Inc, St Louis, MO (US)

( * ) Notice: Subject to any disclaimer, the term of this patent is extended or adjusted under 35 U.S.C. 154(b) by 0 days.

(21) Appl. No.: 16/216,683

(22) Filed: Dec. 11, 2018

(65) Prior Publication Data
US 2020/0178504 A1    Jun. 11, 2020

(51) Int. Cl.
*A01K 29/00*    (2006.01)
*A01K 11/00*    (2006.01)
*G06K 19/06*    (2006.01)
*G06K 9/00*    (2006.01)

(52) U.S. Cl.
CPC .......... *A01K 29/005* (2013.01); *A01K 11/008* (2013.01); *G06K 9/00362* (2013.01); *G06K 19/06037* (2013.01); *A01K 2267/0393* (2013.01)

(58) Field of Classification Search
None
See application file for complete search history.

(56) References Cited

U.S. PATENT DOCUMENTS

| | | | | |
|---|---|---|---|---|
| 5,474,085 A | * | 12/1995 | Hurnik | A01K 11/006 600/587 |
| 5,483,441 A | * | 1/1996 | Scofield | A01K 1/0613 382/110 |
| 5,576,949 A | * | 11/1996 | Scofield | A01K 1/0613 348/135 |
| 6,198,834 B1 | * | 3/2001 | Belk | A22B 5/007 348/89 |
| 6,329,920 B1 | * | 12/2001 | Morrison | A01K 11/006 235/472.02 |
| 6,342,839 B1 | * | 1/2002 | Curkendall | A01K 11/007 340/573.3 |

(Continued)

*Primary Examiner* — Steven Lim
*Assistant Examiner* — Muhammad Adnan
(74) *Attorney, Agent, or Firm* — ADAMSIP, LLC; Edward Garner; J. Hunter Adams

(57) ABSTRACT

A system and method for objectively grading a cut of meat is provided. The system generally comprises an animal having at least one sensor associated therewith, a processor operably connected to the at least one sensor, a QR device operably connected to the processor and configured to read QR codes applied to a cut of meat, a plurality of computing entities operably connected to the processor via a network, and a non-transitory computer-readable medium having instructions stored thereon. The system may collect lifetime data of an animal until fabrication. The system may then track and collect data about the carcass of the animal throughout the fabrication process to the point of sale. Based on this data, the system may create a quality score that a user may view prior to purchasing a cut of meat using an application of their computing device.

16 Claims, 7 Drawing Sheets

(56) References Cited

U.S. PATENT DOCUMENTS

| | | | | |
|---|---|---|---|---|
| 6,701,869 B2* | 3/2004 | Fuqua | ................... | A01K 29/00 |
| | | | | 119/174 |
| 6,751,364 B2* | 6/2004 | Haagensen | ............ | A22B 5/007 |
| | | | | 382/313 |
| 7,464,666 B2* | 12/2008 | Pratt | ................... | A01K 1/0023 |
| | | | | 119/712 |
| 7,810,451 B2* | 10/2010 | Pratt | ................. | G06Q 10/0833 |
| | | | | 119/174 |
| 8,019,662 B2* | 9/2011 | Lucas | ................ | G06Q 20/203 |
| | | | | 705/28 |
| 8,149,125 B2* | 4/2012 | Geissler | ............... | A01K 15/023 |
| | | | | 340/573.2 |
| 8,351,655 B2* | 1/2013 | Hwang | ................. | G01N 33/12 |
| | | | | 382/110 |
| 8,929,971 B2* | 1/2015 | Haynes | ................... | A61B 8/12 |
| | | | | 600/407 |
| 9,881,366 B2* | 1/2018 | Johnson | ............. | A22C 17/0093 |
| 10,532,268 B2* | 1/2020 | Tran | ...................... | A63B 69/36 |
| 2002/0158765 A1* | 10/2002 | Pape | .................... | A01K 11/006 |
| | | | | 340/573.3 |
| 2003/0177025 A1* | 9/2003 | Curkendall | .......... | A01K 11/007 |
| | | | | 340/573.3 |
| 2005/0257748 A1* | 11/2005 | Kriesel | ................. | A01K 29/00 |
| | | | | 119/51.02 |
| 2007/0258625 A1* | 11/2007 | Mirtsching | ............ | A22B 5/007 |
| | | | | 382/110 |
| 2007/0260347 A1* | 11/2007 | Mirtsching | .......... | G06Q 10/087 |
| | | | | 700/115 |
| 2008/0059263 A1* | 3/2008 | Stroman | ............ | G06Q 30/0201 |
| | | | | 705/7.25 |
| 2008/0189085 A1* | 8/2008 | Cook | ...................... | A01K 5/02 |
| | | | | 703/2 |
| 2010/0289644 A1* | 11/2010 | Slavin | .................... | G08B 21/18 |
| | | | | 340/568.1 |
| 2011/0192213 A1* | 8/2011 | Zimmerman | ............ | A01K 5/02 |
| | | | | 73/23.3 |
| 2012/0016814 A1* | 1/2012 | Evans | .................... | G06Q 99/00 |
| | | | | 705/500 |
| 2013/0179088 A1* | 7/2013 | Doyle | ................... | A01K 29/005 |
| | | | | 702/19 |
| 2014/0281479 A1* | 9/2014 | Gettings | ................ | G06Q 10/08 |
| | | | | 713/150 |
| 2017/0055499 A1* | 3/2017 | Peppou | ............... | A01K 11/005 |
| 2017/0202185 A1* | 7/2017 | Trumbull | ............... | G16H 40/67 |
| 2018/0114168 A1* | 4/2018 | Ryan | ..................... | G06Q 10/08 |
| 2018/0279582 A1* | 10/2018 | Yajima | ................. | A01K 29/005 |
| 2019/0335715 A1* | 11/2019 | Hicks | .................... | G06Q 50/02 |
| 2019/0387711 A1* | 12/2019 | Flennert | ................. | H04W 4/38 |
| 2020/0015498 A1* | 1/2020 | Roth | ...................... | A23K 20/142 |

\* cited by examiner

SYSTEM AND METHOD FOR TRACKING AND SCORING ANIMAL HEALTH AND MEAT QUALITY

FIELD OF THE DISCLOSURE

The subject matter of the present disclosure refers generally to a system and method for creating a quality score for a cut of meat based upon objective data measuring the health and well-being of the animal.

BACKGROUND

Determining the quality of a cut of meat can be very difficult. This is truer for certain breeds of animals than others largely because there often are no guidelines to follow when grading a cut of meat. For instance, the United States Department of Agriculture (USDA) has a strict set of guidelines for grading beef, but there are currently no universally applied USDA guidelines for similarly grading pork. This presents a problem because different breeds of a particular animal may produce a different quality of meat from another breed. For instance, a Berkshire pig has a noted clean flavor to its meat, whereas a Landrace pig is known more for the size of its loins. This means that a recipe might be better suited for one particular breed of pig over another. The same might be said for chickens, sheep, goat, etc. However, it is not easy for consumers to access this information when evaluating cuts of meat at the point of purchase. Additionally, no currently established quality certification program incorporates indices of health and wellness into their measures of meat quality.

Further complicating the problem of grading the quality of cuts of meat is the fact that stress experienced during lairage can alter the endocrinology and metabolism of an animal in ways that detrimentally impact the natural cellular processes involved in the conversation of muscle to meat. For instance, pigs are very susceptible to stress, and the quality of the meat can suffer if pigs transported to a fabrication facility are not given a reasonable amount of time to destress. For instance, mixing animals provides a significant social stress that results in fighting which can induce injury and substantial exercise. For instance, during transport and time within the holding pen, pigs typically do not have access to feed and may have limited access to water. Thus, the stress axis evoked and the pigs experience metabolic stress as well (depletion of glycogen stores which impacts the rate of pH decline post-harvest, a factor that directly decreases pork quality (color, water holding capacity etc.). Currently there is no universally available system to monitor stress and wellness during this narrow, critical window in the pork supply chain that significantly impacts quality of a pork cut at the point of purchase.

The current method of destressing animals that have been shipped to a fabrication facility is to place the pigs in pens and rest them for a certain amount of time. The theory is that this will allow the animals' stress levels to dissipate enough to prevent any degradation to the quality of the meat once the fabrication process begins. However, this method is very unscientific. What might be an appropriate amount of time for one group of animals may not be an appropriate amount of time for another group. Further, not all conditions at these fabrication facilities are the same. For instance, one fabrication facility may have holding pens that hold only fifty pigs whereas another may have a holding pen that holds more than one thousand. Even in situations where facilities are able to mostly eliminate social stresses, holding pigs without food or water is a metabolic stress that can alter the quality of the meat. Additionally, seasonality can dramatically impact the effect of lairage (i.e. heat stress or cold stress), which only increases the difficulty in predicting the appropriate time to process an animal.

Accordingly, there is a need in the art for a system and method for creating a quality score for a cut of meat based upon objective data measuring the health and well-being of the animal.

SUMMARY

A system and method for objectively grading a cut of meat that allows establishment of quality standards that form the basis of novel certified/premium branding programs using data collected over the lifetime of the animal and during the fabrication process is provided. The system generally comprises an animal having at least one sensor associated therewith, a processor operably connected to the at least one sensor, a Quick Response (QR) device operably connected to the processor and configured to read QR codes applied to a cut of meat, a plurality of computing entities operably connected to the processor via a network, and a non-transitory computer-readable medium having instructions stored thereon. In one preferred embodiment, the system may store various types of information within data blocks of a distributed ledger created by the plurality of computing entities. One preferred embodiment of the system may comprise a plurality of databases operably connected to the processor. The plurality of databases may be configured to store lifetime data and QR data within animal profiles and QR profiles, respectively. The database may also be configured to store quality scores created via algorithms using the lifetime data and QR data of the animal.

To populate the plurality of computing entities, the system may utilize data obtained from the at least one sensor or the QR reader. In another embodiment, the system may populate the plurality of computing entities using a user interface. In a preferred embodiment, the user interface is operably connected to the plurality of computing entities in a way such that information may be transferred from user interface to the plurality of computing entities, or vice versa. The plurality of computing entities is configured to receive lifetime data and QR data and subsequently store that data within a data block of a ledger shared between each computing entity of the plurality of computing entities. In a preferred embodiment, a data block may be obtained from the plurality of computing entities by a mobile computing device operably connected to the plurality of computing entities. In some instances, the mobile computing device may be operably connected to the plurality of computing entities via one or more servers interconnected between the mobile computing device and plurality of computing entities. Ledger data may be communicated between each computing entity of the plurality of computing entities in real-time or at a slower rate. In a preferred embodiment, the ledger data is updated at least every ten minutes, but may be adjusted by the user based on individual farm animal needs.

The plurality of computing entities preferably connects to one another via a network to create a distributed ledger. The distributed ledger may be continuously updated using consensus mechanisms and concurrency control to ensure consistency of the ledger throughout the network. The ledger preferably comprises data pertaining to physiological parameters informing the health and well-being of the individual animal from which a cut of meat was derived. Information relating to a cut of meat is broken into groups of data called data blocks. The first data block created by the system for an animal is a genesis data block. The information within the genesis data block may be hardcoded to the system and new information may only be added to a subsequent data block, meaning the genesis data block will always represent the start of a particular chain of data blocks.

The system may couple lifetime data and QR data to a data block via an operation. Each time an operation occurs, the system may create a new data block containing the information of both the data block and the lifetime data or QR data. To facilitate the creation of a new data block, the system may provide the plurality of computing entities with lifetime data and/or data and a serial number associated with a particular animal. Using the serial number, the plurality of computing entities may determine the last known data block of a chain of data blocks associated with the serial number and combine the data block with the lifetime data and/or QR data to create a new data block. A new unique serial number may then be generated for the new data block. Once a new data block is created, the plurality of computing entities may determine the authenticity of the new data block. A new data block will only be authenticated by the plurality of computing entities if it is the last data block in the longest chain of data blocks starting from the genesis data block. The plurality of computing entities may confirm the position of a data block within ledger by using the serial number, time stamp, or any other method of identification suitable for identifying the order of a data block within the ledger. Should the new data block be determined to be authentic, the plurality of computing entities may write the new data block into the ledger.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. The term "stress" and grammatical equivalents thereof are used herein to mean an environmental/social stimulus that evokes an unconscious physiological response that alters the behavior/metabolism of an animal or group of animals. The term "wellness" and grammatical equivalents thereof are used herein to mean the fitness of an animal or group of animals based upon physiological parameters informing health and well-being. The term "fabrication" and grammatical equivalents thereof are used herein to mean the harvesting and processing of animals to produce cuts of meat and other byproducts. The term "cut of meat" and grammatical equivalents thereof are used herein to mean the various products that result from the fabrication of an animal.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

As will be evident from the disclosure provided below, the present invention satisfies the need for a system and method capable of creating a quality score for a cut of meat based on data measuring the wellness of the animal.

Figure 1:
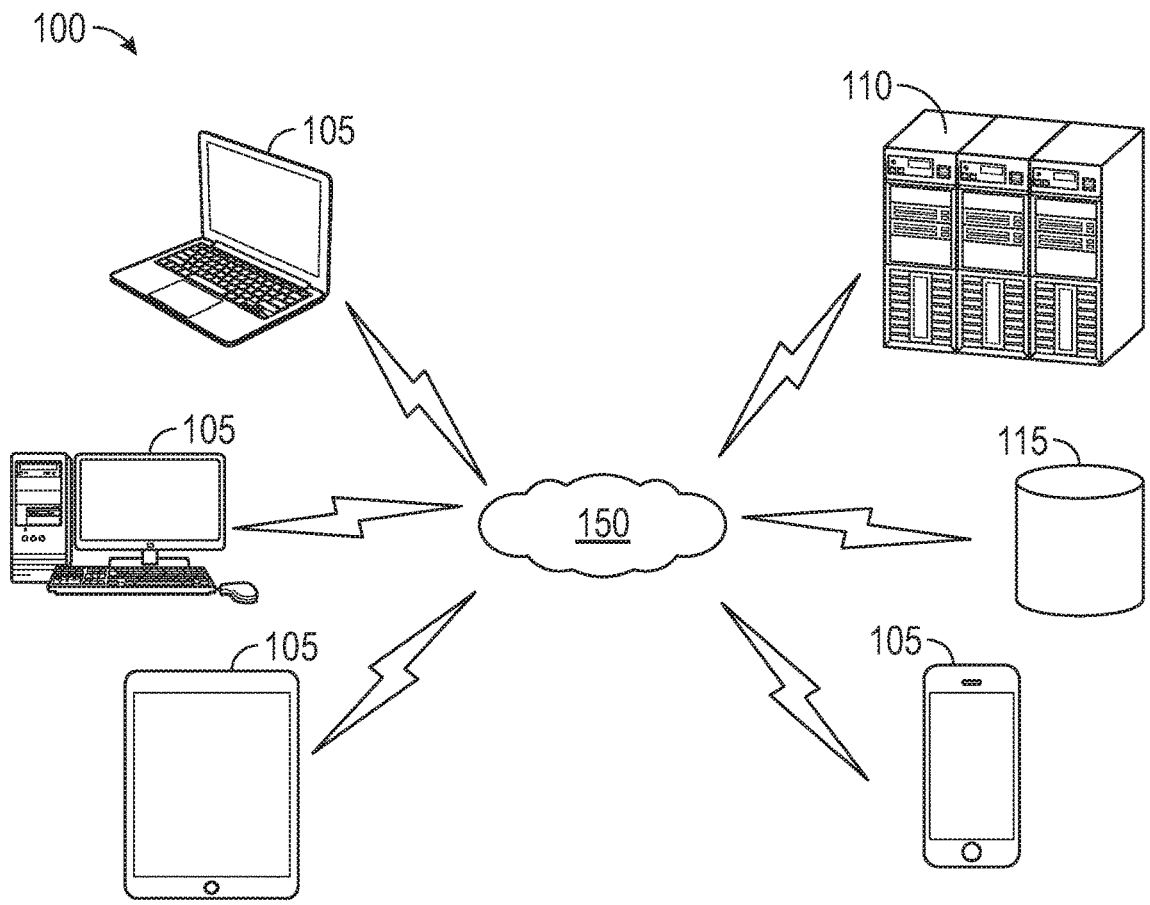
FIG. 1 is a diagram of an example environment in which techniques described herein may be implemented.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a personal digital assistant (PDA), a laptop, a smart phone, a tablet computer, or another type of computation or communication device. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and perform different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
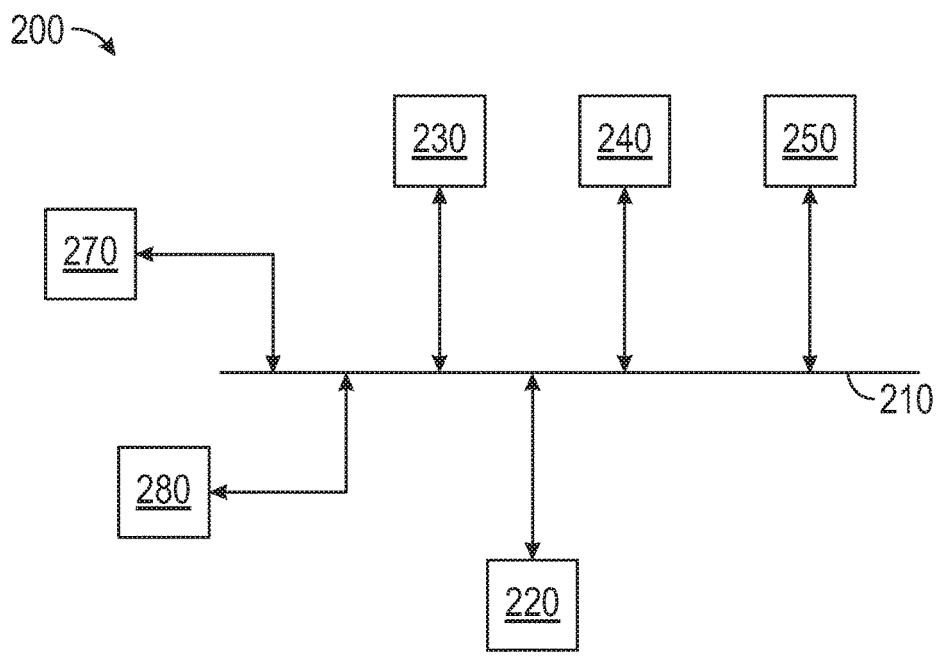
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280. The bus 210 may be defined as one or more conductors that permit communication among the components of the computing entity 200. The processor 220 may be defined as a logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communication between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, Long Range (LoRa), Narrow Band Internet of Things (NB-IoT), Radio Frequency Identification (RFID), etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 411, applications run by a computing entity 200, and wireless communication by a communication device of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers, mainframes, cellular telephones, tablet computers, or any other similar device.

Memory 304 stores information within computing device 300. In some preferred embodiments, memory 304 may include one or more volatile memory units. In another preferred embodiment, memory 304 may include one or more non-volatile memory units. Memory 304 may also include another form of computer-readable medium, such as a magnetic or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to input data and instructions that is then converted into a pattern of electrical signals in binary code that are comprehensible to a computing entity 200. An input device of the peripheral device 270 may include one or more conventional devices that permit a user 405 to input information into the computing entity 200, such as a scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a fitness tracker may transfer data to a smartphone, wherein the smartphone may use that data in a manner separate from the fitness tracker.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
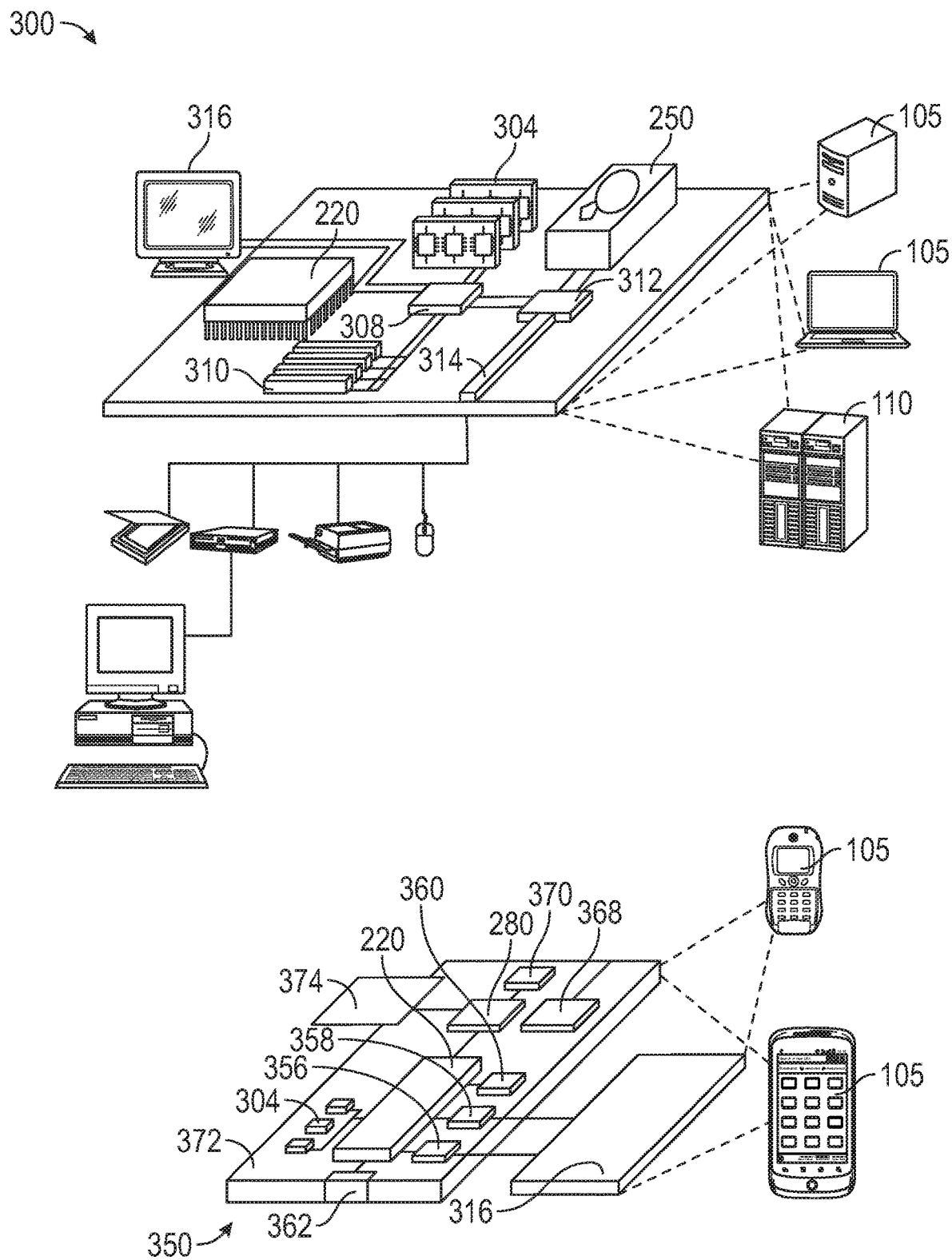
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers, databases, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 to perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MIMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0) and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation-and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with power. In an embodiment, the power supply may be a stationary power outlet. The system 400 may comprise of multiple power supplies that may provide power to the system 400 in different circumstances. For instance, the system 400 may be directly plugged into a stationary power outlet, which may provide power to the system 400 so long as it remains in one place. However, the system 400 may also be connected to a backup battery so that the system 400 may receive power even when it is not connected to a stationary power outlet or if the stationary power outlet ceases to provide power to the computing entity 200.

Figure 4:
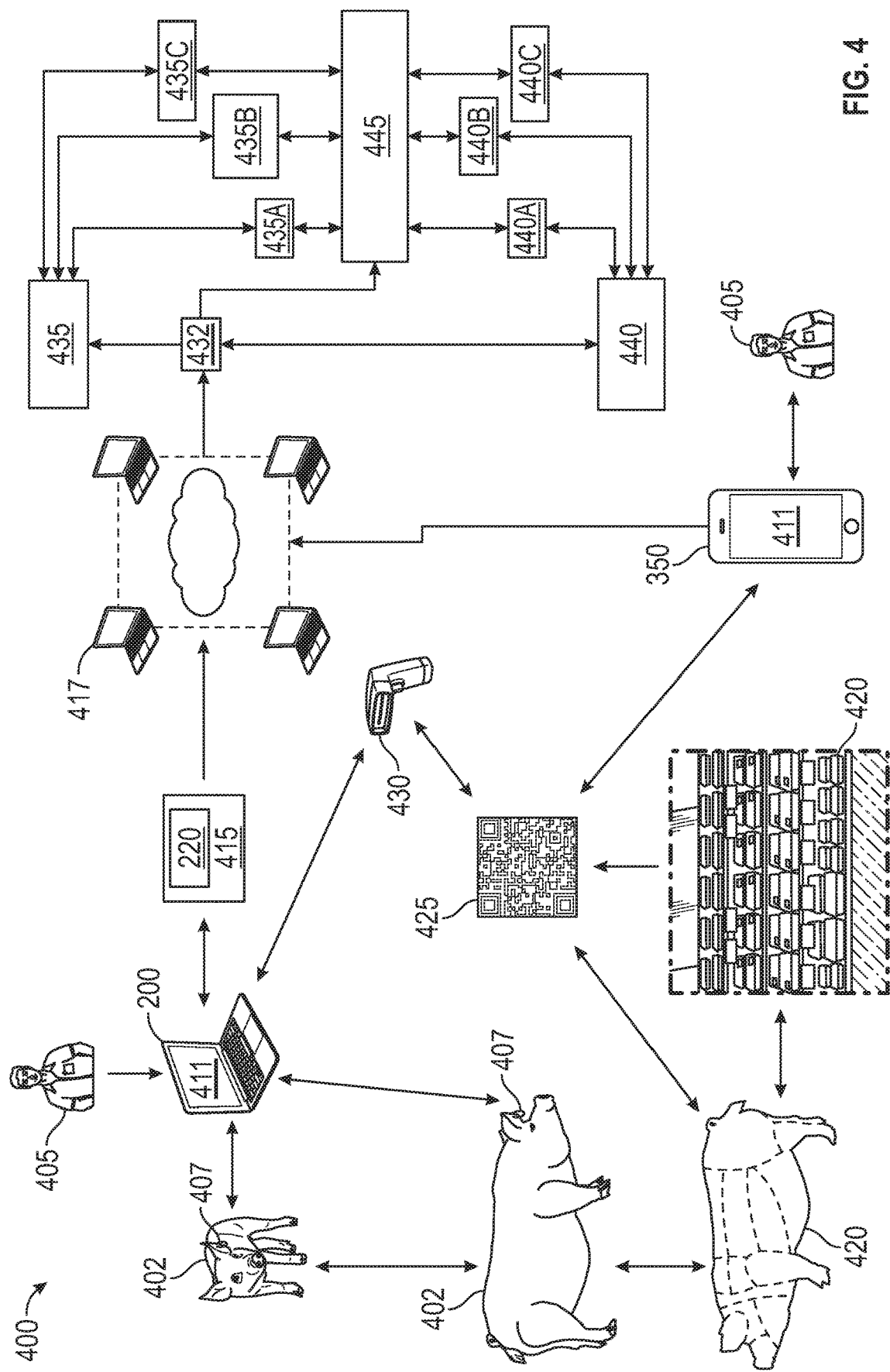
FIG. 4 is a diagram of an example environment in which techniques described herein may be implemented.
Figure 5:
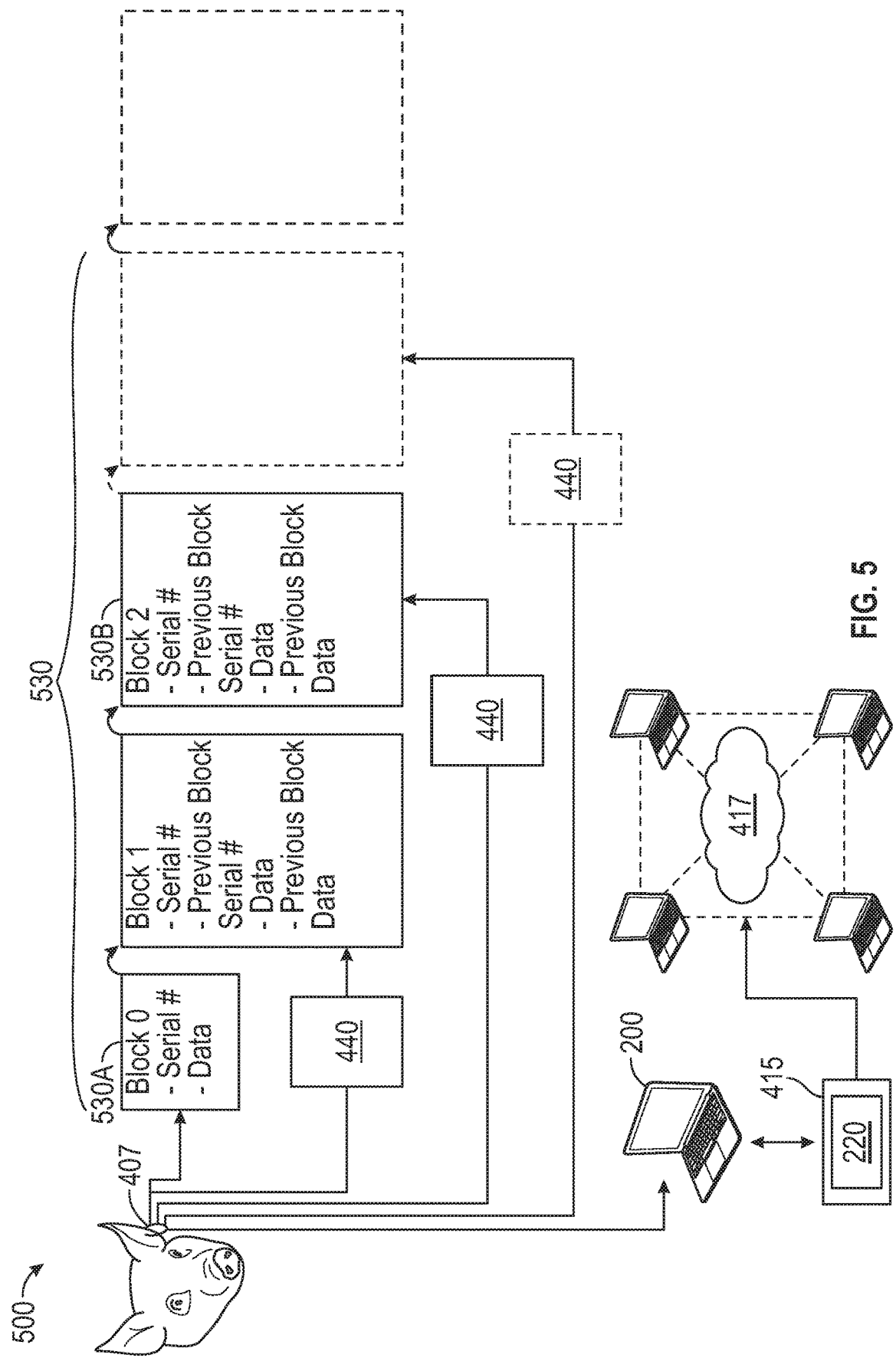
FIG. 5 is a diagram of an example environment in which techniques described herein may be implemented.
Figure 6:
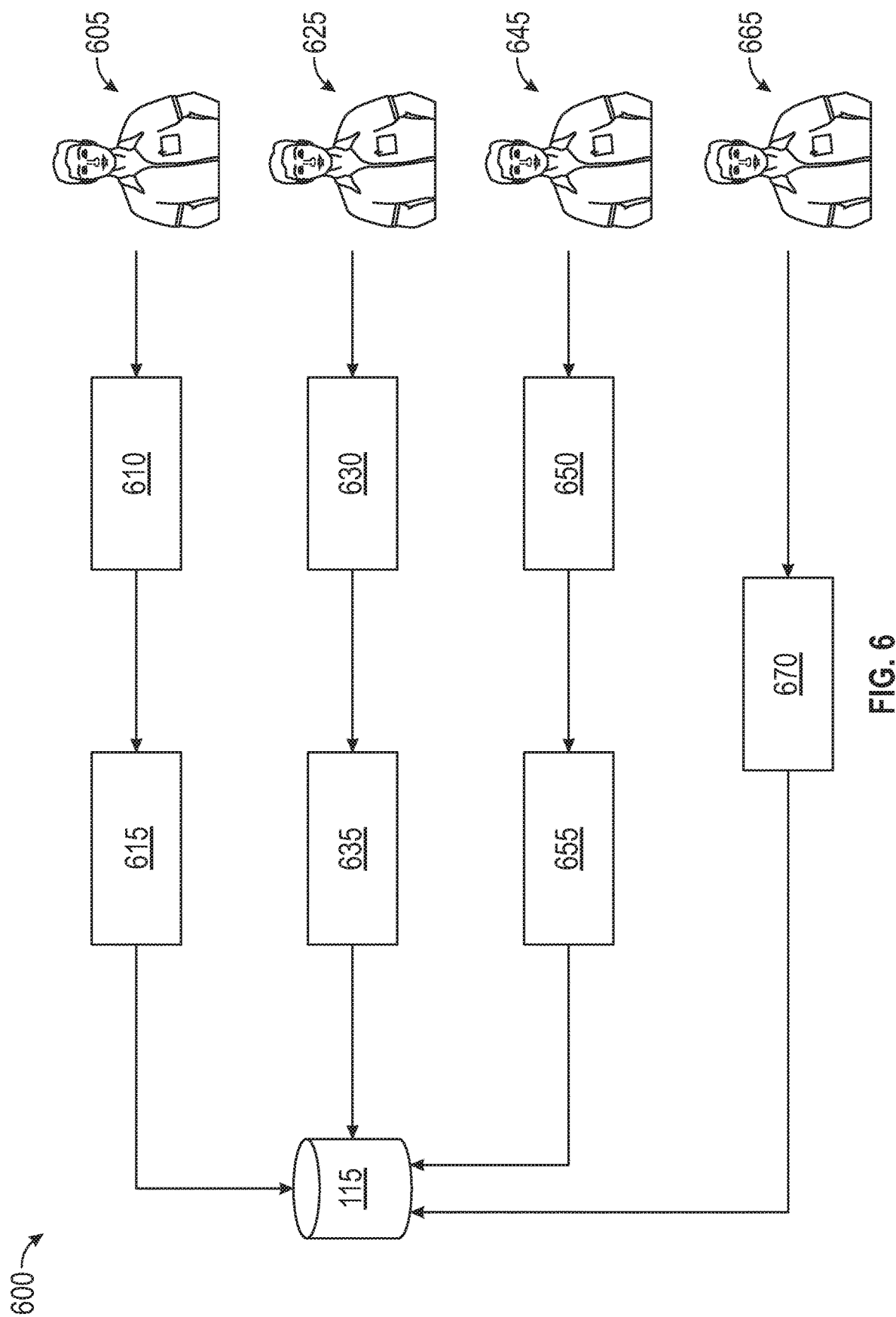
FIG. 6 is a diagram illustrating the manner in which individual access to data may be granted or limited based on user or system roles.
Figure 7:
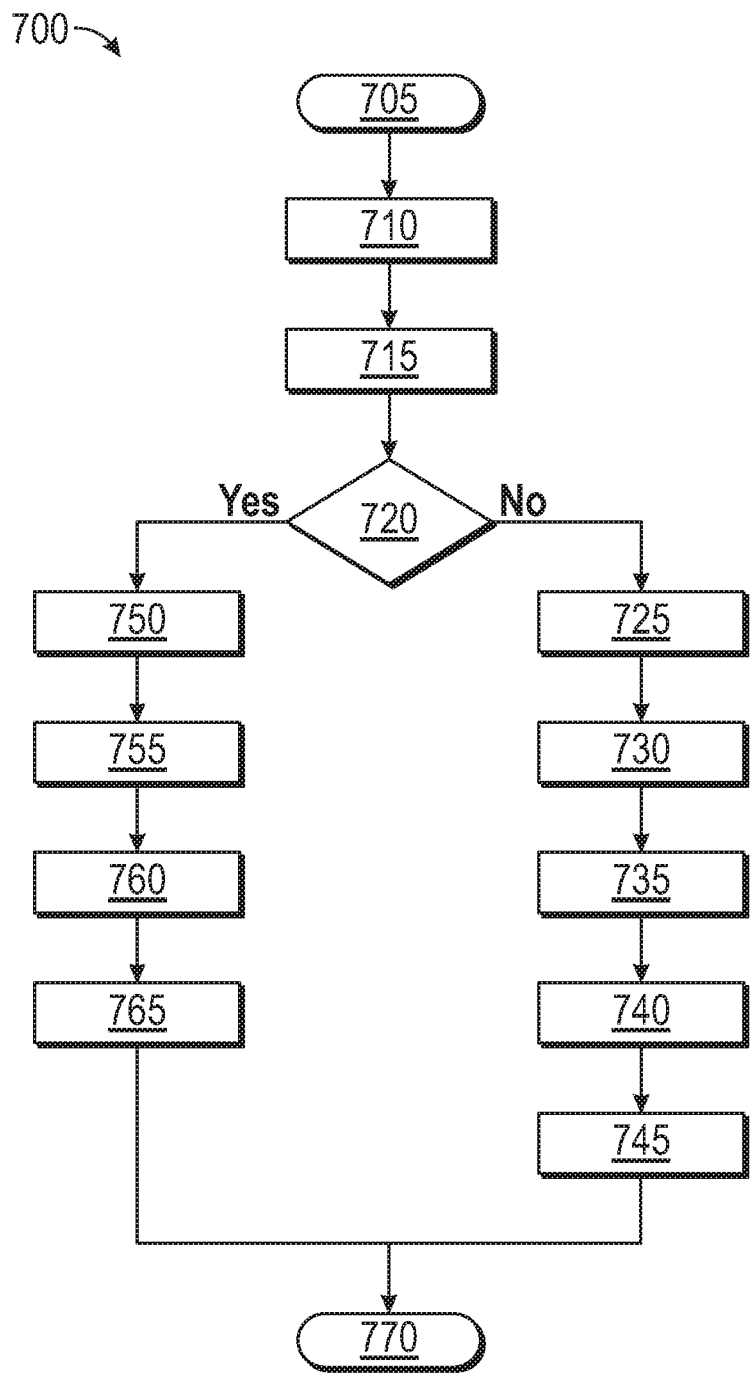
FIG. 7 is a flow chart illustrating certain method steps of a method embodying features consistent with the principles of the present disclosure.
Figures 8, 9:
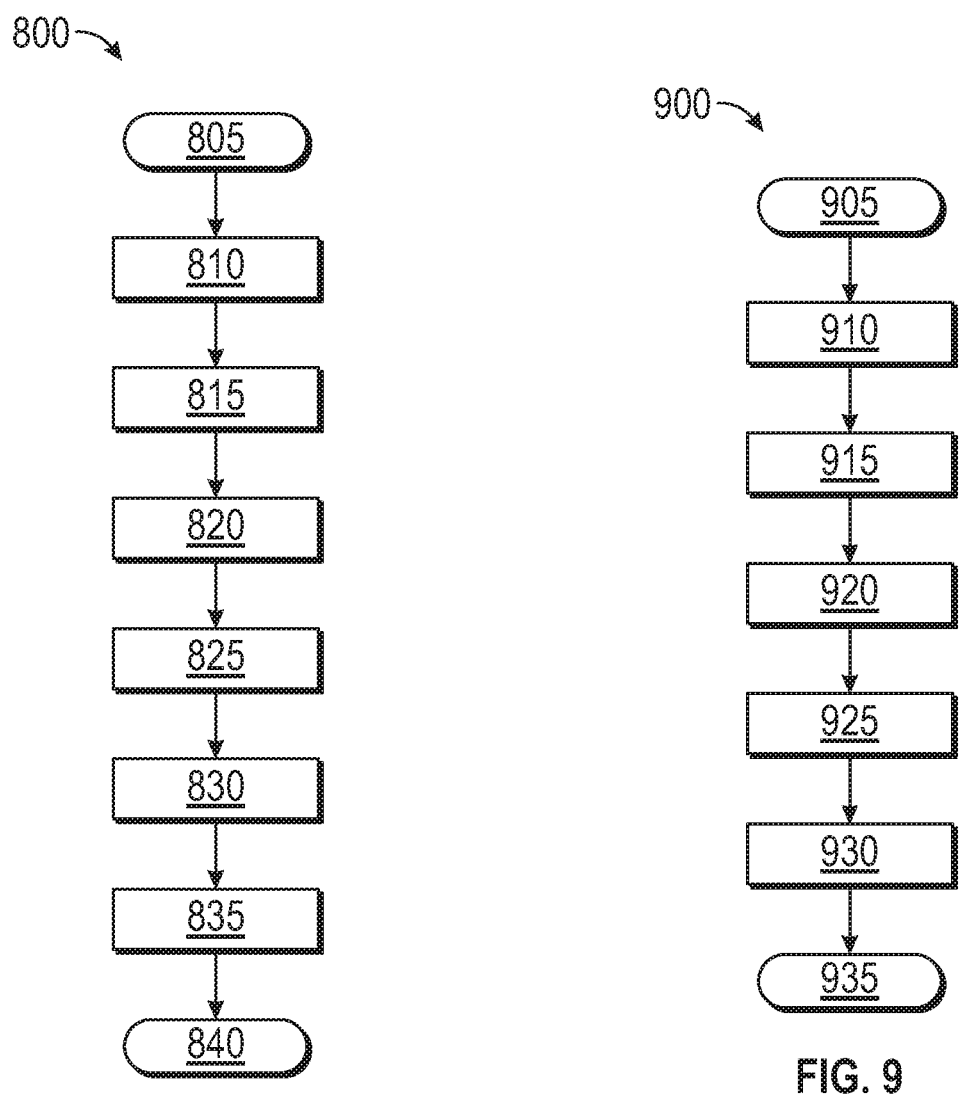
FIG. 8 is a flow chart illustrating certain method steps of a method embodying features consistent with the principles of the present disclosure.
FIG. 9 is a flow chart illustrating certain method steps of a method embodying features consistent with the principles of the present disclosure.

FIGS. 4-9 illustrate embodiments of a system 400 and its various methods for creating a quality score for a cut of meat based on data measuring the wellness of the animal. As illustrated in FIG. 4, the system 400 generally comprises an animal 402 having at least one sensor 407 associated therewith, a processor 220 operably connected to the at least one sensor 407, a Quick Response (QR) device 430 operably connected to the processor 220 and configured to read QR codes 425 of a cut of meat associated with the animal 402, a plurality of computing entities 417 (nodes) being operably connected to the processor 220 via a network 150, and a non-transitory computer-readable medium 415 having instructions stored thereon. In one preferred embodiment, the system 400 may store various types of information within data blocks of a distributed ledger created by the plurality of computing entities 417. It is understood that the various method steps associated with the methods of the present disclosure may be carried out as operations by the system 400 shown in FIG. 4. FIG. 5 illustrates how blockchain may be used to store data of the system 400 within a distributed network. FIG. 6 illustrates permission levels 600 that may be utilized by the present system 400 for controlling access to user content 615, 635, 655 such as lifetime data 440 and QR data 435. FIGS. 7-9 illustrate various methods that may be carried out by the system 400.

One preferred embodiment of the system 400 may comprise a plurality of databases 115 operably connected to the processor 220. The plurality of databases 115 may be configured to store lifetime data 440 and QR data 435 within animal profiles 432. Lifetime data 440 may be defined as data describing the health of an animal 402 over its lifetime, including, but not limited to, heart rate data 440A, respiration rate data, physical activity data 440B, temperature data, and blood oxygen saturation level ($SPO_2$) data 440C, or any combination thereof. QR data 435 may be defined as data that describes the conditions a cut of meat 420 of a particular animal 402 have experienced since that animal 402 was processed, including, but not limited to GPS data 435A, packaging data, preservation data 435B, freezing/thawing data 435C, or any combination thereof. In a preferred embodiment, an animal profile 432 is related to a particular animal 402, but in other embodiments, an animal profile 432 may relate to multiple animals 402 possessing similar characteristics. An animal 402 is preferably associated with a particular animal profile 432.

To populate the plurality of computing entities 417, the system 400 may utilize data obtained from the at least one sensor 407 and/or the QR device 430. In another embodiment, the system 400 may populate the plurality of computing entities 417 using a user interface 411. In a preferred embodiment, the user interface 411 is operably connected to the plurality of computing entities 417 in a way such that information may be transferred from user interface 411 to the plurality of computing entities 417, or vice versa. The plurality of computing entities 417 is configured to receive lifetime data 440 and/or QR data 435 and subsequently store that data within a data block 530 of a distributed ledger 500 shared between each computing entity 200 of the plurality of computing entities 417. In a preferred embodiment, a data block 530 may be obtained from the plurality of computing entities 417 by a mobile computing device 350 operably connected to the plurality of computing entities 417. In some instances, the mobile computing device 350 may be operably connected to the plurality of computing entities 417 via one or more servers interconnected between the mobile computing device 350 and plurality of computing entities 417. Ledger data may be communicated between each computing entity 200 of the plurality of computing entities 417 in real-time or at a slower rate.

In a preferred embodiment as illustrated in FIG. 4, the plurality of computing entities 417 are preferably connected to one another via a network 150 to create a distributed ledger 500. The distributed ledger may be continuously updated using consensus mechanisms and concurrency control to ensure consistency of the ledger throughout the network 150. Consensus mechanisms may be defined as the procedure in which the plurality of computing entities 417 agree to the contents of the distributed ledger 500. Consensus mechanisms may include, but are not limited to proof of work, proof of stake, leased proof of stake, delegated proof of stake, and proof of importance. Concurrency control refers to the procedure used to address conflicts between ledgers within the distributed network. In the preferred embodiment, multi-version concurrency control is used.

The ledger preferably comprises data pertaining to a cut of meat 420 of a particular animal 402. Information relating to a cut of meat 420 is broken into groups of data called data blocks 530. As shown in FIG. 5, the system 400 may create a data block 530 for a cut of meat 420. In the preferred embodiment, the first data block 530 created by the system for an animal 402 is a genesis data block 530A. The genesis data block 530A may include information relating to the birth of an animal 402, including, but not limited to, genealogy of the animal 402, place of birth, gender, breed, etc, or any combination thereof. Alternatively, the genesis data block 530A may simply contain lifetime data 440 of an animal 402 the first time an animal 402 was connected to the system 400 using the at least one sensor 407. In yet another preferred embodiment, the genesis data block 530A may contain QR data 435 of a cut of meat 420 as it is tracked from the fabrication facility to the customer. In one preferred embodiment, the information within the genesis data block 530A is hardcoded to the system 400 and new information may only be added to a subsequent data block 530, meaning the genesis data block 530A will always represent the start of a particular chain of data blocks 530.

In the preferred embodiment as illustrated in FIG. 5, the system 400 may couple lifetime data 440 and QR data 435 to a data block 530. The coupling of lifetime data 440 and QR data 435 to a data block 530 is called an operation. Each time an operation occurs, the system 400 may create a new data block 530B containing the information of both the data block 530 and the lifetime data 440 or QR data 435. In one preferred embodiment, the data block 530 is encrypted in a way such that only certain information within the data block 530 is viewable to a user 405 unless the user 405 decrypts the data block 530. In a preferred embodiment, a data block 530 is never deleted from the system 400. Instead, each data block 530 is saved within the ledger shared between the plurality of computing entities 417. Each data block 530 preferably contains a unique serial number. In one preferred embodiment, a data block 530 is assigned a serial number generated using cryptographic methods to assist the user interface 411 in identifying the data block 530. In another preferred embodiment, each data block 530 may have a time stamp, indicating the date and time the data block 530 was created. In yet another preferred embodiment, a new data block 530B may contain both the assigned serial number and the serial number of the data block 530 that the new data block 530B was generated from.

To facilitate the creation of a new data block 530B, the system 400 may provide the plurality of computing entities 417 with lifetime data 440 or QR data 435 and a serial number associated with a particular animal 402. In a preferred embodiment, a unique serial number may be associated with the at least one sensor attached to the animal or a QR code associated with a cut of meat of a particular animal 402. Using the serial number, the plurality of computing entities 417 may determine the last known data block 530 of a chain of data blocks 530 associated with the serial number and combine the data block with the lifetime data 440 or QR data 435 to create a new data block 530B. A new unique serial number may then be generated for the new data block 530B. In a preferred embodiment, the serial number for a new data block 530B may be created using a hash protocol on the last known data block's 530 serial number. The data block 530 preferably represents a historical data point representing the quality of a cut of meat 420 in the form of a substantially linear set of records outlining the wellness of the animal 402 prior to fabrication and the processing of that animal 402 from the fabrication floor to the store. When combined with a quality score 445, the new data block 530B represents the cut of meat 420 and the most up-to-date version of the wellness history of the live animal 402 and the tracking information that allows the cut of meat 420 to be sourced to the live animal 402. In one preferred embodiment, the serial numbers comprise a cryptographic key pair generated through asymmetric cryptography. In another preferred embodiment, the key pair comprises a public key and a private key. The system 400 may use any algorithm or standard for generating a key pair, including, but not limited to, Elliptic Curve Digital Signature Algorithm, Rivest Shamir Adleman algorithm, or any other key generation algorithm. In another preferred embodiment, the public key is generated using the serial number of the data block 530 submitted by the user 405, and the private key is a cryptographically generated passcode known only to the user 405 in current possession of the data block 530. In another preferred embodiment, the private key is created in a way such that the encrypted information within the data block 530 may be decrypted by the private key.

Once a new data block 530B is created, the plurality of computing entities 417 may determine the authenticity of the new data block 530B. A new data block 530B will only be authenticated by the plurality of computing entities 417 if it is the last data block 530 in the longest chain of data blocks 530 starting from the genesis data block 530A. The plurality of computing entities 417 may confirm the position of a data block 530 within ledger by using the serial number, time stamp, or any other method of identification suitable for identifying the order of a data block 530 within the ledger. In a preferred embodiment, the authenticity of a new data block 530B is calculated as a function of the data block 530 serial numbers, time stamps, and the keys; however, a person skilled in the art will appreciate that other factors may be used in determining the authenticity of a new data block 530B. Should the new data block 530B be determined to be authentic, the plurality of computing entities 417 may write the new data block 530B into the ledger. In a preferred embodiment, once accepted by the plurality of computing entities 417 as authentic, the new data block 530B may never be removed from the ledger, thus ensuring the animal 402 from which a cut of meat 420 came is never in question.

At least one sensor 407 is preferably attached to an animal 402 in a way such that it may measure lifetime data 440 of the animal 402. In one preferred embodiment, the at least one sensor 407 is attached to the ear of the animal 402. For instance, the at least one sensor 407 may be attached to the ear of a pig in a way such that the at least one sensor 407 may record heart rate and temperature data of the pig. In another preferred embodiment, the at least one sensor 407 may be attached to a harness or strap worn by the animal 402. For instance, an at least one sensor 407 may be connected to a bridal or halter for a horse, wherein the at least one sensor 407 may be situated on the bridal or halter in a way that makes contact with the horse's body and measures the horse's heart rate and geolocation. In another embodiment, the at least one sensor 407 may measure lifetime data 440 in an area in which the animal frequents. For instance, an at least one sensor 407 may detect and transmit the environmental conditions in which that animal 402 is living. Environmental conditions in which the at least one sensor 407 may detect include, but are not limited to, temperature, humidity, rainfall, or any combination thereof. In yet another preferred embodiment, the at least one sensor 407 may be used to measure general behavior of the animal 402. For instance, the at least one sensor 407 may be used to determine how much time an animal 402 spends near a trough having a connecting sensor to estimate the amount of food and/or water the animal 402 is consuming.

The at least one sensor 407 may transmit lifetime data 440 to the processor 220 over the animal's 402 lifetime, wherein the processor 220 may transmit that data to a plurality of computing entities 417 in a way such that the lifetime data 440 is saved in the relevant animal profile 432 in the distributed ledger 500 of the plurality of computing entities 417. In a preferred embodiment, the at least one sensor 407 may have an identifier that differentiates one animal 402 from another. For instance, each at least one sensor 407 may have a hard-coded serial number that differentiates one at least one sensor 407 from another. The at least one sensor 407 may transmit the hard-coded serial number along with the lifetime data 440 to the processor 220, which may instruct the plurality of computing entities 417 as to which animal profile 432 within the distributed ledger 500 that the lifetime data 440 should be added. In another preferred embodiment, the at least one sensor 407 may generate a new serial number each time it is attached to an animal 402. For instance, the at least one sensor 407 that was removed from one animal 402 and placed on another animal 402 may generate a new serial number that may allow the system 400 to differentiate between animals 402 that have used the same at least one sensor 407. In another preferred embodiment, the system 100 may be connected to third-party systems having lifetime data 440, wherein the system 400 may receive the lifetime data 440 from the third-party systems and populate animal profiles 432 with the third-party lifetime data 440.

For animals 402 that are to be processed into various cuts of meat 420, the animal 402 may be transported to a processing facility once the animal 402 has reached a size in which fabrication is desirable. The at least one sensor 407 may continue to record lifetime data 440 until fabrication begins. In one preferred embodiment, the at least one sensor 407 may be deactivated prior to the stunning of the animal 402. For instance, a user 405 may remove the at least one sensor 407 from a pig prior to prior to euthanasia via the established method utilized by the fabricator. For instance, a user 405 may deactivate the at least one sensor 407 using a user interface 411 of the system 400 prior to stunning a chicken using a $CO_2$ gas chamber. In another preferred embodiment, the at least one sensor 407 may be deactivated after processing has occurred. For instance, the at least one sensor 407 may be removed from the ear of a pig once the head of the pig has been removed from the body during fabrication. For instance, the at least one sensor 407 may be removed from the foot of a chicken once the feet have been removed from the chicken during fabrication.

Once the at least one sensor 407 is no longer associated with an animal 402, a holding tag having an animal ID may be used to identify the animal 402. In another embodiment, a QR code 425 may also be associated with the animal 402 in place of the at least one sensor 407. The QR code 425 is designed to instruct a QR device 430 to transmit QR data 435 to the plurality of computing entities 417, wherein the plurality of computing entities 417 places QR data 435 within an animal profile 432 associated with the QR code 425. In a preferred embodiment, the QR code 425 is associated with the animal 402 via the serial number of the at least one sensor 407. Before the animal carcass is fabricated into component primal cuts, there are a number of processes which need to occur. One of these processes is scalding where the animal has been stunned, exsanguinated and hung from a hook and rail system and immersed in high temperature water to remove surface debris and matter, including hair, from the skin. Because the temperature of the water is so high, many forms of identification, such as adhesive backed labels containing QR codes, may be removed from the holding tag with the high temperature water. Therefore, in one preferred embodiment, a direct or permanent identification imprint may be needed on the part of the holding tag that remains with the animal through the scalding process for identification purposes during fabrication. Once the animal has exited the scalder and remains on hook and rail, the QR code may be reapplied to the carcass based on matching the animal ID the at least one sensor.

As the carcass is then processed into various cuts of meat 420 on a fabrication floor, the QR code 425 may be easily and securely paired with the cuts of meat 420 so that each part of the animal 402 may be tracked throughout the fabrication process. For instance, the carcass of pig that had been previously fitted with an at least one sensor 407 may be paired with a QR code 425 at the beginning of the fabrication process, wherein the QR code 425 contains data pertaining to the serial number of the at least one sensor 407. The pig may be tagged with the QR code 425 in a chill room prior to going through the various stages of fabrication. The carcass may then be removed from the chill room and processed into primal cuts which then may be further processed into subprimal cuts that resemble products readily identifiable by consumers at the point of sale. During this process, fabricated primal cuts of meat may also be associated with a QR code 425 and sent down the fabrication floor line, wherein the such labeled cuts may be further processed into common subprimal products. This process may continue until the fabrication facility has processed the carcass into the various cuts of meat 420 that are further broken down at case-ready facilities or the cuts of meat 420 sold at stores. If the cuts of meat 420 are further processed at the case-ready facility or store, the cuts of meat 420 may continue to be paired with the QR code 425 to ensure the chain is never broken. In another preferred embodiment, the system 100 may be connected to third-party systems having QR data 435, wherein the system 400 may receive the QR data 435 from the third-party systems and populate animal profiles 432 with the third-party lifetime data 440.

Once a cut of meat 420 is placed for sale to consumers, a user 405 may scan the QR code 425 associated with a cut of meat 420 using their mobile computing device 350. In a preferred embodiment, a user interface 411 of the mobile computing device 350 may allow a user 405 to scan the QR code 425 of a cut of meat 420. Scanning the QR code 425 using the user interface 411 may cause the mobile computing device 350 to query the plurality of computing entities 417 for lifetime data 440 and QR data 435 associated with the animal profile 432 coupled to the QR code 425. Once the mobile computing device 350 receives the lifetime data 440 and QR data 435, the user interface 411 may present the lifetime data 440 and QR data 435 to the user 405 so that the user may ascertain the quality of the cut of meat 420. In one preferred embodiment, the user interface 411 may also present a quality score 445 to the user via the user interface 411. A quality score 445 may be defined as a grade that may indicate the quality of a cut of meat 420 based on certain criteria such as the health of the animal 402 from which the cut of meat 420 came and the freshness of the cut of meat 420. As used herein, the term "freshness" may be defined as days since fabrication. The health of an animal 402 may be gleaned from the lifetime data 440, and the freshness of the cut of meat 420 may be gleaned from the QR data 435. However, one with skill in the art will appreciate that other data may be used by the system 400 to determine the quality of a cut of meat 420. Because each cut of meat 420 is associated with a QR code 425 paired with an animal profile 432 throughout the entire fabrication process, there is never a break in the chain regarding the animal 402 and the cut of meat 420. This may allow the system 400 to track the animal from farm to store and may allow the system 400 to more accurately grade the quality of a particular cut of meat 420.

To determine the quality score 445, lifetime data 440 and QR data 435 relating to all variables measured is gathered and compiled. Based on this data, the system 400 may generate a score that may describe the quality of the cut of meat 420. In a preferred embodiment, the quality score 445 is calculated by the system 400 using qualitative analysis methods. This may be performed by the system 400 by determining the stress level of an animal 402 over its lifetime using lifetime data 440. For instance, the system 400 may use heartrate data 440A, activity data 440B, and blood oxygen saturation data 440C to predict the stress an animal 402 experienced throughout its lifetime. For instance, the system 400 may use geolocation data or activity data 440B to predict how much exercise an animal 402 received throughout a period of its lifetime or its entire lifetime. In another preferred embodiment, the system 400 may calculate the quality score 445 using a quantitative data analysis. For instance, the quality score 445 may comprise a plurality of categories that grade the quality of the meat based on different criteria. In one preferred embodiment, the quality score 445 may consist of a health category, defining the health of the animal 402 from which the cut of meat 420 came, and a freshness category, defining the freshness of the cut of meat 420. These categories may be further broken down into sub categories. For instance, the health category may be further broken down into heart rate, disease, vaccinated, castrated, age, gender, feed (organic or genetically modified), and antibiotics sub categories. For instance, the freshness category may be further broken down into storage temperature, days since processing, and distance traveled sub categories. In some embodiment, the sub categories may be further broken down into additional sub categories. In one preferred embodiment, the system 400 may score each category and/or sub category and add the categories and/or subcategories together to calculate a quality score 445.

To determine a quality score 445 using a quantitative method, the system 400 may grade lifetime data 440 and QR data 435 of an animal profile 432 using defined limits. In one preferred embodiment, the system 400 may compare the lifetime data 440 and QR data 435 to a scoring limit, wherein a scoring limit places a defined value on a category if the data within that category falls within a defined range. For instance, a cut of meat 420 may receive one point towards its quality score 445 in a "days since processing" category if the animal 402 from which the cut of meat 420 came was processed between one to three days prior to the consumer scanning the meat with their mobile computing device 350. For instance, if an animal 402 was transported a great distance and not given a proper amount of time to destress during lairage before undergoing fabrication, a cut of meat 420 may receive zero points towards its quality score 445 since the failure to allow the animal 402 to destress likely altered the endocrinology and metabolism of the animal 402 in ways that detrimentally impacted the quality of the cut of meat 420. For instance, a cut of meat 420 may receive zero points towards its quality score 445 in an "antibiotics" category if the animal 402 from which the cut of meat 420 came were given any antibiotics while being raised. The system 400 may also use the lifetime data 440 and QR data 435 to provide the user 405 with predictive information about a cut of meat 420. For instance, the system 400 may predict that it would be more conducive to cook a cut of meat 420 using a particular preparation method, such as frying or broiling, based on the breed of the animal 402. For instance, the system 400 may provide the user 405 with data indicating how the quality of a cut of meat 420 may degrade or improve over time. In a preferred embodiment, the user interface 411 may present predictive information to a user 405 when a user 405 scans the QR code 425 with a mobile computing device 350. This may be useful to restaurants in that a patron of the restaurant may scan a barcode associated with a cut of meat that may be featured in a certain dish. In this way, the patron may learn more about the ingredients within the dishes they are considering purchasing.

As mentioned previously, the system 400 may further comprise a user interface 411. Additional lifetime data may be added to an animal profile via the user interface. For instance, lifetime data regarding genealogy, gender, date of birth, and weight may be input into an animal profile via the user interface. A user interface 411 may be defined as a space where interactions between a user 405 and the system 400 may take place. In an embodiment, the interactions may take place in a way such that a user 405 may control the operations of the system 400. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the user interface 411 to the user 405 via a display 316 operably connected to the processor 220. A display 316 may be defined as an output device that communicates data that may include, but is not limited to, visual, auditory, cutaneous, kinesthetic, olfactory, and gustatory, or any combination thereof.

Information presented via a display 316 may be referred to as a soft copy of the information because the information exists electronically and is presented for a temporary period of time. Information stored on the non-transitory computer-readable medium 415 may be referred to as the hard copy of the information. For instance, a display 316 may present a soft copy of visual information via a liquid crystal display (LCD), wherein the hardcopy of the visual information is stored on a local hard drive. For instance, a display 316 may present a soft copy of audio information via a speaker, wherein the hard copy of the audio information is stored on a flash drive. For instance, a display 316 may present a soft copy of tactile information via a LCD monitor, wherein the hard copy of the tactile information is stored within a database 115. Displays 316 may include, but are not limited to, cathode ray tube monitors, LCD monitors, light emitting diode (LED) monitors, gas plasma monitors, screen readers, speech synthesizers, virtual reality headsets, speakers, and scent generating devices, or any combination thereof.

In some embodiments of the system 400, the user interface 411 of the mobile computing device 350 may calculate the quality score 445. For instance, once the mobile computing device 350 has received the lifetime data 440 and QR data 435 from the plurality of computing entities 417, the mobile computing device 350 may perform a qualitative analysis or quantitative analysis on the data to calculate a quality score 445. In one preferred embodiment, a user 405 may create their own grading system by creating custom scoring limits within the user interface 411 of the mobile computing device 350. For instance, a user 405 may determine that more points should be awarded for genealogy and breed that for stress level of a pig. For instance, a user 405 may determine that a cut of meat 420 processed one to two days prior to purchase should receive the highest possible score in a freshness category instead of a cut of meat 420 processed one to three days prior to purchase. In this way, users 405 may customize the system 400 in a way such that they may find cuts of meat 420 more tailored to their personal preferences.

To prevent un-authorized user 405 from accessing other user's 405 information, the system 400 may employ a security method. As illustrated in FIG. 6, the security method of the system 400 may comprise a plurality of permission levels 600 that may grant users 405 access to user content 615, 635, 655 within the database 115 while simultaneously denying users 405 without appropriate permission levels 600 the ability to view user content 615, 635, 655. To access the user content 615, 635, 655 stored within the database 115, users 405 may be required to make a request via a user interface 411. Access to the data within the database 115 may be granted or denied by the processor 220 based on verification of a requesting user's 605, 625, 645 permission level 600. If the requesting user's 605, 625, 645 permission level 600 is sufficient, the processor 220 may provide the requesting user 605, 625, 645 access to user content 615, 635, 655 stored within the database 115. Conversely, if the requesting user's 605, 625, 645 permission level 600 is insufficient, the processor 220 may deny the requesting user 605, 625, 645 access to user content 615, 635, 655 stored within the database 115. In an embodiment, permission levels 600 may be based on user roles 610, 630, 650 and administrator roles 670, as illustrated in FIG. 6. User roles 610, 630, 650 allow requesting users 605, 625, 645 to access user content 615, 635, 655 that a user 405 has uploaded and/or otherwise obtained through use of the system 400. Administrator roles 670 allow administrators 665 to access system 400 wide data.

In an embodiment, user roles 610, 630, 650 may be assigned to a user in a way such that a requesting user 605, 625, 645 may view animal profiles 432 containing lifetime data 440 and QR data 435 via a user interface 411. To access the data within the database 115, a user 405 may make a user request via the user interface 411 to the processor 220. In an embodiment, the processor 220 may grant or deny the request based on the permission level 600 associated with the requesting user 605, 625, 645. Only users having appropriate user roles 610, 630, 650 or administrator roles 670 may access the data within the animal profiles 432. For instance, as illustrated in FIG. 6, requesting user 1 605 has permission to view user 1 content 615 and user 2 content 635 whereas requesting user 2 625 only has permission to view user 2 content 635. Alternatively, user content 615, 635, 655 may be restricted in a way such that a user may only view a limited amount of user content 615, 635, 655. For instance, requesting user 3 645 may be granted a permission level 600 that only allows them to view user 3 content 655 related to their specific financial institution but not user 3 content 655 related to other financial institutions. In the example illustrated in FIG. 6, an administrator 665 may bestow a new permission level 600 on users so that it may grant them greater permissions or lesser permissions. For instance, an administrator 665 may bestow a greater permission level 600 on other users so that they may view user 3's content 655 and/or any other user's content 615, 635, 655. Therefore, the permission levels 600 of the system 400 may be assigned to users 405 in various ways without departing from the inventive subject matter described herein.

In an embodiment, a user 405 may create a user profile and save various cuts of meat 420 to their user profile using the user interface 411 of their mobile computing device 350. In an embodiment, user profiles may be saved to the distributed ledger of the plurality of computing entities 417 in the same way animal profiles 432 are saved to the plurality of computing entities 417. Whenever a user 405 saves a cut of meat to their user profile, the system 400 may create a genesis block for that cut of meat 420 and save it within the user's 405 user profile. Alternatively, user profiles may be saved in a standard database 115 separate from the distributed ledger. In another preferred embodiment, the system 400 may link user profiles having a particular cut of meat 420 saved therein to the animal profile 432 associated with that particular cut of meat 420. This may allow the system 400 to trace the locations of various cuts of meat after they have been sold to customers. In yet another embodiment, the system 400 may be used to alert users 405 if there has been a recall for a particular cut of meat 420 due to health risks such as E. coli or salmonella. For instance, should a particular cut of meat 420 be suspected of being contaminated, the system 400 may have a function that allows a user 405 to flag a particular animal profile 432 as "recalled." If a user 405 has a particular cut of meat 420 saved within their user profile that is associated with an animal profile 432 that has been flagged as "recalled," the system 400 may alert the user 405 that the particular cut of meat 420 is suspected of being contaminated.

FIG. 7 provides a flow chart 700 illustrating certain, preferred method steps that may be used to carry out the method of adding lifetime data 440 to an animal profile 432. Step 705 indicates the beginning of the method. During step 710 the processor 220 may receive lifetime data 440 of the animal 402 as well as the serial number of the at least one sensor 407 from the at least one sensor 407. The processor 220 may then perform a query to determine if the serial number of the at least one sensor 407 is associated with an animal profile 432 or not during step 715. The processor 220 may perform an action based on the results of the query during step 720. If the processor 220 determines that no animal profile 432 is associated with the serial number, the processor 220 may create a new animal profile 432 during step 725. In a preferred embodiment, the animal profile 432 is saved within a distributed ledger of the plurality of computing entities 417. Once the animal profile has been created, the processor 220 the processor 220 may generate a unique serial number based on the lifetime data 440 provided by the at least one sensor 407 during step 730. Once the serial number is generated, the processor 220 may transfer the serial number to the animal profile 432 during step 735. In the preferred embodiment, the serial number is a cryptographically generated public key. During step 740, a genesis data block 530A may be created by the system 400 using the lifetime data 440 and the serial number. The system 400 may then save the genesis data block 530A to the animal profile 432 during step 745. Once the genesis data block 530A has been saved to the animal profile 432, the method may proceed to the terminate method step 770.

If the processor 220 determines that an animal profile 432 is associated with the serial number, the processor 220 may generate a unique serial number for a new data block 530B during step 750. In a preferred embodiment, the unique serial number is based on the public key of the last data block 530 in the oldest chain of data blocks 530. In another preferred embodiment, a hash protocol may be used to generate a new key from the public key of the he last data block 530 in the oldest chain of data blocks 530. Once a unique serial number has been generated, the processor 220 may transfer the new serial number to the animal profile during step 755. The processor may then generate the new data block during step 760 using the last data block 530 in the oldest chain of data blocks 530, the lifetime data 440, and the new serial number. The processor 220 may then save the new data block 530B to the animal profile during step 765. Once the new data block 530B has been created and saved to the animal profile 432, the method may proceed to the terminate method step 770.

In one preferred embodiment, a user interface 411 of the system 100 may prompt a user 405 to input certain lifetime data 440 before the genesis data block 530A may be created. In another embodiment, a user 405 may select within the user interface 411 to create a genesis data block 530A for an animal profile 432. The user interface 411 may then prompt the user 405 to provide various lifetime data 440, including, but not limited to, genealogy of the animal 402, place of birth, gender, breed, or any other information relevant to the health of an animal 402. The user 405 may then associate an at least one sensor 407 attached to the animal 402 with the genesis data block 530 of the animal profile 432. When creating a genesis data block 530A, certain fields of information may be required. If these fields are not provided by a user 405, the system 400 may not proceed to create the genesis data block 530. Accordingly, in one preferred embodiment, the method of the present disclosure may further comprise a missing field step. During the missing field step, the processor 220 may review the lifetime data 440 provided by the user 405 to assess whether all required fields have been inputted. If all required fields have been inputted, the system 400 may subsequently proceed to the generate a genesis data block 530 and save it to the animal profile 432. If a user 405 fails to provide one or more required fields, the user interface 411 may prompt the user 405 to input the missing fields of lifetime data 440. Required lifetime data 440 fields may include, but are not limited to, genealogy of the animal, place of birth, gender, breed, or a combination thereof.

In another preferred embodiment, the processor 415 may create both a new public key and a new private key. The user interface 411 may receive a new private key from the processor 415 and securely send it to the user 405. In another preferred embodiment, the data within the new data block 430B may be encrypted in a way such that certain data of the new data block 430B is only viewable if a user 405 also has the new private key. The new private key is preferably created in a way such that the encrypted information within the new data block 430B may be decrypted by the new private key. In one preferred embodiment, the processor 220 may create both a public key and a private key. The user interface 411 may receive a private key from the processor 220 and securely send it to the user 405. This may allow animal suppliers to securely access data related with their livestock. In another preferred embodiment, the data within the genesis data block 530A may be encrypted in a way such that certain data of the genesis data block 530A is only viewable if a user 405 also has a private key. The private key is preferably created in a way such that the encrypted information within the genesis data block 530A may be decrypted by the private key.

FIG. 8 provides a flow chart 800 illustrating certain, preferred method steps that may be used to carry out the method of creating and adding a data block 530 having QR data 435 to an animal profile 432. Step 805 indicates the beginning of the method. During step 810 processor 220 may receive QR data 435 from the QR device 430. The processor 220 may then pair the QR data 435 with the corresponding animal profile 432 in step 815. Once the QR data has been paired with the correct animal profile based on the information within the QR code, the processor 220 may generate a unique serial number for a new data block 530B during step 820. In a preferred embodiment, the unique serial number is based on the public key of the last data block 530 in the oldest chain of data blocks 530. In another preferred embodiment, a hash protocol may be used to generate a new key from the public key of the he last data block 530 in the oldest chain of data blocks 530. Once a unique serial number has been generated, the processor 220 may transfer the new serial number to the animal profile during step 825. The processor may then generate the new data block during step 830 using the last data block 530 in the oldest chain of data blocks 530, the lifetime data 440, and the new serial number. The processor 220 may then save the new data block 530B to the animal profile during step 835. Once the new data block 530B has been created and saved to the animal profile 432, the method may proceed to the terminate method step 840.

FIG. 9 provides a flow chart 900 illustrating certain, preferred method steps that may be used to carry out the method of providing a user 405 with lifetime data, QR data, and quality score data for a particular piece of meat. Step 905 indicates the beginning of the method. During step 910 the mobile computing device 350 may read a QR code 425 of a particular cut of meat 420. The mobile computing device 350 may then submit a request to the plurality of computing entities 417 for information regarding the animal 402 from which the cut of meat 420 came during step 915. In a preferred embodiment, the information requested from the plurality of computing entities 417 comprises lifetime data 440 and QR data 435. In some embodiments, the mobile computing device 350 may also request a quality score 445. The mobile computing device 350 may wait for the requested information from the plurality of computing entities 417 during step 920. Once the mobile computing device 350 has received the requested information from the plurality of computing entities 417, the mobile computing device 350 may sort the data within the user interface 411 of the mobile computing device 350 during step 925. The mobile computing device 350 may then display the requested information during step 930 after it has been sorted within the user interface 411. Once the information has been presented to the user 405 via the display 316, the method may proceed to the terminate method step 935.

The subject matter described herein may be embodied in systems, apparatuses, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for creating a quality score for an animal, said system comprising:
    at least one sensor configured to be attached to said animal
    wherein said at least one sensor is configured to detect and transmit lifetime data of said animal during a lifetime of said animal a Quick Response code (QR) reader configured to read QR codes on cuts of meat associated with said animal
    wherein said QR reader transmits QR data,
    a processor operably connected to said at least one sensor,
    wherein said processor receives said lifetime data from said at least one sensor and said QR data from said QR reader,
    a power supply,
    a plurality of computing entities operably connected to said processor,
    wherein said plurality of computing entities receive said lifetime data and said QR data from said processor,
    wherein said plurality of computing entities create a distributed ledger of said lifetime data and said QR data using at least one data block,
    a non-transitory computer-readable medium coupled to said processor and having instructions stored thereon, which, when executed by said processor, cause said processor to perform operations comprising:
    receiving said lifetime data transmitted by said at least one sensor, and
    transferring said lifetime data to said plurality of computing entities,
    receiving said QR data transmitted by said QR reader, and transferring said QR data to said plurality of computing entities,
    creating said quality score based on said lifetime data and said QR data.

2. The system of claim 1, further comprising additional instructions stored on said non-transitory computer-readable medium, which, when executed by said processor, cause said processor to perform additional operations comprising:
    transferring said quality score to said plurality of computing entities.

3. The system of claim 1, wherein said non-transitory computer-readable medium stores data transmitted to and from said processor.

4. The system of claim 1, wherein said at least one sensor comprises at least one of a global positioning system, temperature sensor, and heart rate monitor.

5. The system of claim 1, further comprising a secondary computing entity operably connected to a secondary processor and said plurality of computing entities,
    wherein said secondary computing entity comprises a user interface programmed to receive said lifetime data and said quality score.

6. The system of claim 5, wherein said secondary computing entity is a mobile computing device.

7. The system of claim 5, further comprising additional instructions stored on a secondary non-transitory computer-readable medium, which, when executed by said secondary processor, cause
    said secondary processor to perform additional operations comprising:
    receiving said lifetime data from said plurality of computing entities,
    receiving said quality score from said plurality of computing entities,
    displaying said lifetime data within a display.

8. A system for creating a quality score for an animal, said system comprising:
    at least one sensor configured to be attached to said animal
    wherein said at least one sensor is configured to detect and transmit lifetime data of said animal during a lifetime of said animal a Quick Response code (QR) reader configured to read QR codes on cuts of meat associated with said animal,
    wherein said QR code contains environmental data relevant to said cuts of meat,
    a processor operably connected to said QR reader, wherein said processor receives said QR data from said QR reader, a power supply, a plurality of computing entities operably connected to said processor, wherein said plurality of computing entities receive said QR data from said processor, wherein said plurality of computing entities create a distributed ledger of said QR data using at least one data block, a non-transitory computer-readable medium coupled to said processor and having instructions stored thereon, which, when executed by said processor, cause said processor to perform operations comprising:

receiving said QR data transmitted by said QR reader, and transmitting said QR data to said plurality of computing entities, creating said quality score based on said lifetime data and said QR data.

9. The system of claim 8, further comprising additional instructions stored on said non-transitory computer-readable medium, which, when executed by said processor, cause said processor to perform additional operations comprising:
transferring said quality score to said plurality of computing entities.

10. The system of claim 8, wherein said non-transitory computer-readable medium stores data transmitted to and from said processor.

11. The system of claim 8, further comprising a secondary computing entity operably connected to a secondary processor and said plurality of computing entities,
wherein said secondary computing entity comprises a user interface programmed to receive said QR data and said quality score.

12. The system of claim 11, further comprising additional instructions stored on a secondary non-transitory computer-readable medium, which, when executed by said secondary processor, cause said secondary processor to perform additional operations comprising:
receiving said QR data from said plurality of computing entities, receiving said quality score from said plurality of computing entities, and displaying said QR data and said quality score within a display.

13. A system for creating a quality score for an animal, said system comprising:
at least one sensor configured to be attached to said animal wherein said at least one sensor is configured to detect and transmit lifetime data of said animal,
a Quick Response code (QR) reader configured to read QR codes on cuts of meat associated with said animal,
wherein said QR reader transmits QR data, a processor operably connected to said at least one sensor and said QR reader,
wherein said processor receives said lifetime data from said at least one sensor and said QR data from said QR reader,
a power supply,
a plurality of computing entities operably connected to said processor,
wherein said plurality of computing entities receive said lifetime data and said QR data from said processor,
wherein said plurality of computing entities create a distributed ledger of said lifetime data and said QR data using at least one data block wherein said plurality of computing entities create said quality score based on said lifetime data and said QR data,
a non-transitory computer-readable medium coupled to said processor and having instructions stored thereon, which, when executed by said processor, cause said processor to perform operations comprising:
receiving said lifetime data transmitted by said at least one sensor, transferring said lifetime data to said plurality of computing entities, receiving said QR data transmitted by said QR reader, and transferring said QR data to said plurality of computing entities.

14. The system of claim 13, wherein said non-transitory computer-readable medium stores data transmitted to and from said processor.

15. The system of claim 13, further comprising a secondary computing entity operably connected to a secondary processor and said plurality of computing entities,
wherein said secondary computing entity comprises a user interface programmed to receive said QR data and said quality score.

16. The system of claim 15, further comprising additional instructions stored on a secondary non- transitory computer-readable medium, which, when executed by said secondary processor, cause said secondary processor to perform additional operations comprising:
receiving said lifetime data from said plurality of computing entities,
receiving said QR data from said plurality of computing entities,
receiving said quality score from said plurality of computing entities, and
displaying said lifetime data, said QR data, and said quality score within a display.

* * * * *